(12) United States Patent
Kinoshita et al.

(10) Patent No.: US 6,627,703 B2
(45) Date of Patent: Sep. 30, 2003

(54) AIR CONTENT STABILIZING AGENTS FOR HYDRAULIC CEMENT COMPOSITIONS AND HYDRAULIC CEMENT COMPOSITIONS CONTAINING SAME

(75) Inventors: Mitsuo Kinoshita, Aichi (JP); Shinji Tamaki, Aichi (JP)

(73) Assignee: Takemoto Yushi Kabushiki Kaisha, Aichi (JP)

( * ) Notice: Subject to any disclaimer, the term of this patent is extended or adjusted under 35 U.S.C. 154(b) by 0 days.

(21) Appl. No.: 09/972,846

(22) Filed: Oct. 4, 2001

(65) Prior Publication Data

US 2002/0108536 A1 Aug. 15, 2002

(30) Foreign Application Priority Data

Oct. 6, 2000 (JP) .......................................... 2000-307546

(51) Int. Cl.[7] .................................................. C08F 8/14
(52) U.S. Cl. ...................... 525/327.7; 106/728; 525/384
(58) Field of Search ............................... 525/327.7, 384; 106/728; 524/5

(56) References Cited

U.S. PATENT DOCUMENTS 5,158,996 A * 10/1992 Valenti ........................... 524/5
5,391,632 A * 2/1995 Krull et al. ............... 525/327.6
5,798,425 A * 8/1998 Albrecht et al. ............. 526/271
5,912,284 A * 6/1999 Hirata et al. .................... 524/5

* cited by examiner

Primary Examiner—Bernard Lipman
(74) Attorney, Agent, or Firm—Beyer Weaver & Thomas LLP

(57) ABSTRACT

An agent for stabilizing air content of hydraulic cement compositions includes graft copolymers obtained by a first step in which copolymers with average numerical molecular weight 5000–50000 are obtained by radical polymerization of a mixture of radical polymerizable monomers containing anhydrous maleic acid and monomers of a specified form, together in an amount of 80 molar % or more and at molar ratio of 40/60–60/40 and a second step in which graft copolymers are obtained by a graft reaction of 100 weight parts of the copolymers obtained in the first step and 7–60 weight parts of polyoxyalkylene monoalkylether and/or polyoxyalkylene monoalkenylether with a block addition of a total of 23–70 moles of ethylene oxide and propylene oxide per 1 mole of aliphatic alcohol with 8–20 carbon atoms. A hydraulic cement composition is produced with cement, aggregates, water, a cement dispersant, an agent for controlling air content and contains an agent for stabilizing air content as described above in the amount of 0.001–0.5 weight parts per 100 weight parts of the cement.

16 Claims, No Drawings

AIR CONTENT STABILIZING AGENTS FOR HYDRAULIC CEMENT COMPOSITIONS AND HYDRAULIC CEMENT COMPOSITIONS CONTAINING SAME

BACKGROUND OF THE INVENTION

This invention relates to air content stabilizing agents for hydraulic cement compositions (herein referred to simply as "air content stabilizing agents") and hydraulic cement compositions containing such agents. When a prepared hydraulic cement composition such as concrete or mortar is transported while being kneaded either continuously or intermittently or is being stored temporarily, the entrained air content tends to increase with time. This invention relates more particularly to air content stabilizing agents for inhibiting such an increase with time in the entrained air content and stabilizing it with time, as well as hydraulic cement compositions containing such agents.

When a hydraulic cement composition is prepared, a cement dispersant (such as polycarboxylic acid cement dispersant, in particular, recently), an antifoaming agent and an agent for controlling air content such as an air entraining agent are mixed together in addition to cement, aggregates and water to be kneaded together. When a hydraulic cement composition is transported while being kneaded continuously or intermittently or is stored temporarily, however, there is the problem that its entrained air content increases with time. If the entrained air content increases, the strength of hardened objects produced from such a hydraulic cement composition is lowered. Japanese Patent Publications Tokkai 7-157348 and 9-183642 and U.S. Pat. Nos. 4,808,641 and 4,948,429 have disclosed additives for stabilizing the entrained air content of hydraulic cement compositions but these additives are not capable of addressing this problem satisfactorily, and some of them even have an adverse effect on the fluidity of hydraulic cement compositions.

SUMMARY OF THE INVENTION

It is therefore an object of this invention to provide air content stabilizing agents which are capable of inhibiting the increase in the entrained air content of a prepared hydraulic cement composition being transported while being kneaded continuously or intermittently or being temporarily stored and stabilizing its entrained air content without adversely affecting its fluidity.

It is another object of this invention to provide hydraulic cement compositions containing such an air content stabilizing agent.

This invention is based on the discovery by the present inventors as a result of their diligent researches in view of the objects described above that a graft copolymer of a certain kind should be used as an air content stabilizing agent.

DETAILED DESCRIPTION OF THE INVENTION

The invention relates to air content stabilizing agents characterized as comprising graft copolymers obtained by the following two steps which are herein referred to as the "first step" and the "second step". The first step is a step of obtaining copolymers with average numerical molecular weight 5000–50000 by radical polymerization of a mixture of radical polymerizable monomers containing anhydrous maleic acid and monomers of the form given by Formula 1 below, together in an amount of 80 molar % or more and at molar ratio of 40/60–60/40; the second step is a step of obtaining the graft copolymers by a graft reaction of 100 weight parts of the copolymers obtained in the first step and 7–60 weight parts of polyoxyalkylene monoalkylether and/or polyoxyalkylene monoalkenylether with a block addition of a total of 23–70 moles of ethylene oxide and propylene oxide per 1 mole of aliphatic alcohol with 8–20 carbon atoms:

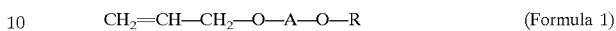

$$CH_2=CH-CH_2-O-A-O-R \qquad \text{(Formula 1)}$$

where R is hydrogen, methyl group or a residual group obtained by removing the hydroxyl group from aliphatic acid with 1–18 carbon atoms, and A is a residual group obtained by removing all hydroxyl groups from (poly)alkylene glycol with repetition number 1–80 of oxyalkylene units consisting either only of oxyethylene units or of both oxyethylene units and oxypropylene units.

The invention also relates to hydraulic cement compositions characterized not only as comprising cement, aggregates, water, a cement dispersant and an agent for controlling air content, but also wherein an air content stabilizing agent of this invention as described above is contained in an amount of 0.001–0.5 weight parts per 100 weight parts of cement.

Air content stabilizing agents of this invention will be explained first. The air content stabilizing agents of this invention are characterized as comprising graft copolymers obtained by the aforementioned first and second steps. The first step is for obtaining copolymers by radical polymerization of a mixture of radical polymerizable monomers. According to this invention, the first step uses a mixture containing anhydrous maleic acid and monomers of Formula 1, together in an amount of 80 molar % or more and at a molar ratio of 40/60–60/40, and preferably 55/45–45/55.

Examples of what A may be in Formula 1 include (1) residual groups obtained by removing all hydroxyl groups from (poly)ethylene glycol of which oxyalkylene units consist only of oxyethylene units, and (2) residual groups obtained by removing all hydroxyl groups from (poly)ethylene (poly)propylene glycol of which oxyalkylene units consist of both oxyethylene units and oxypropylene units. In the case of (2), the combination of oxyethylene units and oxypropylene units may be by random addition, block addition or by both, but examples of type (1) are preferred. The repetition number of the oxyalkylene units in A is 1–80, but it is preferably 10–50.

Examples of what R may be in Formula 1 include hydrogen, methyl group and residual groups obtained by removing the hydroxyl group from aliphatic acid with 1–18. Among these, methyl group and acetyl group are preferred.

Practical examples of monomers, shown by Formula 1 explained above, include (1) α-allyl-ω-hydroxy-(poly)oxyethylene, (2) α-allyl-ω-methyl-(poly)oxyethylene, (3) α-allyl-ω-alkyloyl-(poly)oxyethylene, (4) α-allyl-ω-hydroxy-(poly)oxyethylene (poly)oxypropylene, (5) α-allyl-ω-methyl-(poly)oxyethylene (poly)oxypropylene, and (6) α-allyl-ω-alkyloyl-(poly)oxyethylene (poly)oxypropylene.

The mixture of radical polymerizable monomers in the first step contains anhydrous maleic acid and monomers of Formula 1 together in an amount of 80 molar % or more. In other words, radical polymerizable monomers of other types may be contained in an amount of 20 molar % or less. Examples of radical polymerizable monomers of such other types include styrene, vinyl acetate, acrylic acid, acrylic acid alkyl esters, (meth)allyl sulfonic acid and (meth)allyl sulfonic acid salts. Among these, styrene is preferred.

In the first step, a radical initiator is added to the mixture described above to cause radical polymerization and to obtain copolymers with average numerical molecular weight (hereinafter Pullulan converted by GPC method) of 5000–50000, or preferably 10000–40000. Any of known radical polymerization methods may be used for this purpose, such as (1) methods of radical polymerization of a mixture of radical polymerizable monomers without the use of a solvent and (2) methods of radical polymerization by dissolving a mixture of radical polymerizable monomers in a solvent such as benzene, toluene, xylene, methyl isobutyl ketone and dioxyane. Of the above, methods according to (1) are preferred, and it is more preferred to obtain copolymers with average numerical molecular weight of 10000–40000 by a method of (1). A method of (1) may be carried out by placing a mixture of polymerizable monomers in a reactor can and adding a radical initiator in a nitrogen atmosphere to cause a radical polymerization reaction at 60–90° C. for 5–10 hours. Methods of (1) without the use of a solvent are advantageous in that cumbersome steps of collecting and refining the solvent which has been used can be dispensed with. In order to obtain desired copolymers by controlling the radical polymerization reaction either by a method of (1) without using a solvent or by a method of (2) by using a solvent, kinds and amounts of radical initiator and radical chain transfer agent to be used, polymerization temperature and polymerization time are appropriately selected. Examples of radical initiators that may be used in this invention include azo initiators such as azobis isobutylonitrile and 2,2'-azobis(4-methoxy-2,4-dimethylvaleronitrile) and organic peroxide initiators such as benzoyl peroxide, lauroyl peroxide and cumene hydroperoxide.

In the second step, graft copolymers serving as air content stabilizing agents of this invention are obtained by a graft reaction of polyoxyalkylene monoalkylether and/or polyoxyalkylene monoalkenylether with the copolymers obtained in the first step. According to the present invention, what is obtained by a block addition of a total of 23–70 moles of ethylene oxide and propylene oxide to 1 mole of aliphatic alcohol with 8–20 carbon atoms is used as the aforementioned polyoxyalkylene monoalkylether and/or polyoxyalkylene monoalkenylether of the second step.

Examples of aliphatic carboxylic alcohol which may be used for producing the aforementioned polyoxyalkylene monoalkylether and/or polyoxyalkylene monoalkenylether of the second step include (1) saturated aliphatic alcohols with 8–20 carbon atoms such as octanol, nonanol, decanol, undecanol, dodecanol, tridecanol, tetradecanol, pentadecanol, hexadecanol, octadecanol, isooctadecanol and duodecanol, and (2) unsaturated aliphatic alcohols with 8–20 carbon atoms such as decenol, tetradecenol, octadecenol and eicosenol. Among these, aliphatic alcohols with 12–18 carbon atoms are preferable.

Examples of polyoxyalkylene monoalkylether and/or polyoxyalkylene monoalkenylether of the second step include those obtained by a block addition of a total of 23–70 moles of ethylene oxide and propylene oxide to 1 mole of aliphatic alcohol as described above, but those with a block addition of 3–10 moles of ethylene oxide and 20–60 moles of propylene oxide are preferred. There is no particular limitation as to the order of addition of ethylene oxide and propylene oxide to aliphatic alcohol, but those obtained by adding propylene oxide first to aliphatic alcohol and then ethylene oxide are preferred. Polyoxyalkylene monoalkylether and/or polyoxyalkylene monoalkenyl ether described above can be synthesized by a conventionally known method.

In the second step, graft copolymers are obtained by a graft reaction of 7–60 weight parts, and preferably 10–50 weight parts, of polyoxyalkylene monoalkylether and/or polyoxyalkylene monoalkenylether as explained above with 100 weight parts of the copolymers obtained in the first step. A conventionally known method may be used for such a graft reaction. For example, graft copolymers can be obtained by placing the copolymers obtained in the first step, polyoxyalkylene monoalkylether and/or polyoxyalkylene monoalkenylether and an esterification catalyst inside a reactor can and carrying out a graft reaction at 90° C. for 4–6 hours after a nitrogen atmosphere is established. A conventionally known esterification catalyst which is used for ring-opening esterification reactions of anhydrous acid and alcohol may be used, but amine catalysts are preferred, and lower alkylamines are particularly preferred.

Next, hydraulic cement compositions embodying this invention are described. The hydraulic cement compositions embodying this invention are characterized not only as containing cement, aggregates, water, a cement dispersant and an agent for controlling air content but also wherein an air content stabilizing agent of this invention is contained in an amount of 0.001–0.5 weight parts, and preferably 0.005–0.3 weight parts per 100 weight parts of cement.

Examples of cement which may be used to produce hydraulic cement compositions embodying this invention include different kinds of portland cement such as normal portland cement, high early portland cement, moderate heat portland cement and belite-rich portland cement, and different kinds of blended cement such as blast-furnace slag cement, fly ash cement and silica pozzolan cement, as well as alumina cement. Powder materials such as lime stone powder, calcium carbonate, silica fume, blast-furnace slag powder and fly ash may also be used in part as a substitute for cement. Many kinds of conventionally known cement dispersant may be used such as polycarboxylic acid cement dispersants. Examples of such polycarboxylic acid cement dispersant include water-soluble vinyl copolymers obtained by copolymerizing (meth)acrylic acid salt with alkoxy polyethyleneglycol methacrylate or further with monomers which are copolymerizable therewith (as disclosed in Japanese Patent Publications Tokko 59–18338 and 5–11057), copolymers of anhydrous maleic acid and alkenylether and water-soluble vinyl copolymers comprising their derivatives (as disclosed in Japanese Patent Publications Tokko 58–38380 and Tokkai 2-163108). Many known kinds of antifoaming agent and air entraining agent may also be used as an agent for controlling air content.

Methods of producing hydraulic cement compositions of this invention include: (1) methods of adding an air content stabilizing agent of this invention and water with kneading when water is added to cement, aggregates, a cement dispersant and an agent for controlling air content to be mixed together; (2) methods of preliminarily mixing an air content stabilizing agent of this invention into a cement dispersant when water is added to cement, aggregates, a cement dispersant and an agent for controlling air content to be mixed together; and (3) methods of adding an air content stabilizing agent of this invention after water is added to cement, aggregates, a cement dispersant and an agent for controlling air content and then kneading them together again.

Air content stabilizing agents embodying this invention can be used for hydraulic cement compositions such as mortar containing cement, fine aggregates, water, a cement dispersant and an agent for controlling air content and also concrete which further contains coarse aggregates so as to inhibit the increase in entrained air content with time as they are being transported while being kneaded either continuously or intermittently or being temporarily stored and to stabilize the entrained air content with time. Such effects are particularly noteworthy with hydraulic cement compositions of the type using polycarboxylic acid agent as the cement dispersant.

In the opinion of the present inventors, it is for the following reasons that air content stabilizing agents embodying this inventions are effective as described above. The air content stabilizing agents of this invention comprise graft copolymers and these graft copolymers are of the structure having a copolymerized part of the first step as a trunk polymer and polyoxyalkylene monoalkylether and/or polyalkylene monoalkenylether part of the second step as graft chain and this graft chain is connected to the trunk copolymer by ester bonding. In such a graft copolymer, the part of the graft chain has the antifoaming function and the part of the trunk polymer has the function of a cement dispersant. The antifoaming and cement-dispersing functions of the graft copolymers themselves are not significant but if hydraulic cement compositions are prepared by using them, these graft copolymers gradually undergo hydrolysis due to alkali components of the hydraulic cement compositions, splitting into the trunk polymer part and the graft chain part and thereby gradually releasing into the hydraulic cement compositions both antifoaming and cement-dispersing components. This is believed to be how the increase in the entrained air content of hydraulic cement compositions with time as they are being transported while being kneaded either continuously or intermittently or being temporarily stored can be inhibited and the entrained air content can be stabilized with time.

The following six embodiments may be considered for describing air content stabilizing agents of the present invention:

(1) Air content stabilizing agent comprising graft copolymer (P-1) obtained by the first step and the second step described below:

The first step: Step of obtaining copolymers with average numerical molecular weight of 14300 by radical polymerization of a mixture of radical polymerizable monomers containing a total of 100 molar % of anhydrous maleic acid and α-allyl-ω-methyl-polyoxyethylene (with repetition number of oxyethylene units equal to 7, hereinafter written as n=7) at a molar ratio of 50/50.

The second step: Step of obtaining graft copolymers (P-1) by a graft reaction of 20 weight parts of polyoxyalkylene monoalkenylether having a block addition of 6 moles of ethylene oxide and 40 moles of propylene oxide per 1 mole of oleyl alcohol to 100 weight parts of the copolymer obtained in the first step.

(2) Air content stabilizing agent comprising graft copolymer (P-2) obtained by the first step and the second step described below:

The first step: Step of obtaining copolymers with average numerical molecular weight of 25900 by radical polymerization of a mixture of radical polymerizable monomers containing a total of 100 molar % of anhydrous maleic acid and α-allyl-ω-methyl-polyoxyethylene (n=35) at a molar ratio of 50/50.

The second step: Step of obtaining graft copolymers (P-2) by a graft reaction of 11 weight parts of polyoxyalkylene monoalkenylether of aforementioned Embodiment (1) to 100 weight parts of the copolymer obtained in the first step.

(3) Air content stabilizing agent comprising graft copolymer (P-3) obtained by the first step and the second step described below:

The first step: Step of obtaining copolymers with average numerical molecular weight of 31000 by radical polymerization of a mixture of radical polymerizable monomers containing a total of 100 molar % of anhydrous maleic acid and α-allyl-ω-methyl-polyoxyethylene (n=60) at a molar ratio of 50/50.

The second step: Step of obtaining graft copolymers (P-3) by a graft reaction of 15 weight parts of polyoxyalkylene monoalkylether having a block addition of 3 moles of ethylene oxide and 35 moles of propylene oxide per 1 mole of lauryl alcohol to 100 weight parts of the copolymer obtained in the first step.

(4) Air content stabilizing agent comprising graft copolymer (P-4) obtained by the first step and the second step described below:

The first step: Step of obtaining copolymers with average numerical molecular weight of 10700 by radical polymerization of a mixture of radical polymerizable monomers containing a total of 100 molar % of anhydrous maleic acid and α-allyl-ω-acetyl-polyoxyethylene (n=40) at a molar ratio of 50/50.

The second step: Step of obtaining graft copolymers (P-4) by a graft reaction of 40 weight parts of polyoxyalkylene monoalkenylether of aforementioned Embodiment (1) to 100 weight parts of the copolymer obtained in the first step.

(5) Air content stabilizing agent comprising graft copolymer (P-6) obtained by the first step and the second step described below:

The first step: Step of obtaining copolymers with average numerical molecular weight of 14100 by radical polymerization of a mixture of radical polymerizable monomers containing a total of 100 molar % of anhydrous maleic acid, α-allyl-ω-methyl-polyoxyethylene (n=40) and styrene at a molar ratio of 50/45/5.

The second step: Step of obtaining graft copolymers (P-6) by a graft reaction of 25 weight parts of polyoxyalkylene monoalkylether of aforementioned Embodiment (3) to 100 weight parts of the copolymer obtained in the first step.

(6) Air content stabilizing agent comprising graft copolymer (P-7) obtained by the first step and the second step described below:

The first step: Step of obtaining copolymers with average numerical molecular weight of 22000 by radical polymerization of a mixture of radical polymerizable monomers containing a total of 100 molar % of anhydrous maleic acid, α-allyl-ω-methyl-polyoxyethylene (n=35) and styrene at a molar ratio of 50/35/15.

The second step: Step of obtaining graft copolymers (P-7) by a graft reaction of 15 weight parts of polyoxyalkylene monoalkenylether of aforementioned Embodiment (1) to 100 weight parts of the copolymer obtained in the first step.

The following are mentioned as embodiments of hydraulic cement composition according to this invention:

(7) Concrete containing cement by 330 kg/m$^3$, fine aggregates by 867 kg/m$^3$, coarse aggregates by 960 kg/m$^3$ and water 165 kg/m$^3$ as well as a polycarboxylic acid cement dispersant and an agent for controlling air content, and also containing any one of the air content stabilizing agents (1)–(6) described above in an amount of 0.005–0.3 weight parts per 100 weight parts of cement.

(8) Concrete containing cement by 500 kg/m$^3$, fine aggregates by 742 kg/m$^3$, coarse aggregates by 944 kg/m$^3$ and water 165 kg/m$^3$ as well as a polycarboxylic acid cement dispersant and an agent for controlling air content, and also containing any one of the air content stabilizing agents (1)–(6) described above in an amount of 0.005–0.3 weight parts per 100 weight parts of cement.

In what follows, the invention will be described by way of the results of test examples but it goes without saying that the invention is not limited to these examples.

EXAMPLES
Part 1: Synthesis of Air Content Stabilizing Agents

Test Example 1

Synthesis of Graft Copolymer (P-1)

After anhydrous maleic acid 98 g (1.0 mole) and α-allyl-ω-methyl-polyoxyethylene (n=7) 380 g (1.0 mole) were placed inside a reactor and dissolved uniformly with stirring, the atmosphere was replaced with nitrogen. A radical polymerization reaction was then started by adding benzoyl peroxide 2 g while the temperature of the reacting system was kept at 70° C. by means of a temperature bath. After the reaction was started, benzoyl peroxide 4 g was further added by portions and the radical polymerization reaction was continued for 4 hours until it was concluded. The copolymerized substance thus obtained was analyzed and found to be a copolymerized substance with average numerical molecular weight of 14300 containing maleic acid and α-allyl-ω-methyl-polyoxyethylene (n=7) at molar ratio of 50/50 as converted to original materials. Next, this copolymerized substance 100 g was placed inside a reactor vessel together with 20 g of polyoxyalkylene monoalkenylether with block addition of ethylene oxide 6 moles and propylene oxide 40 moles to 1 mole of oleyl alcohol and 8 g of tributylamine as catalyst and the atmosphere was replaced with nitrogen gas. An esterification reaction was carried out with stirring for 4 hours at 90° C. to obtain graft copolymer (P-1).

Test Examples 2–7 and Comparison Examples 1–5

Synthesis of Graft Copolymers (P-2)-(P-7) and (R-1)-(R-5)

Graft copolymers (P-2)-(P-7) and (R-1)-(R-5) were similarly obtained as described above regarding graft copolymer (P-1). Details are summarized in Table 1.

TABLE 1

| | | Copolymer in First Step | | | | | |
| | | Copolymerization ratio (molar %) | | | | | |
| | Kind of Graft Copolymer, etc. | Anhydrous Maleic Acid Molar % | Monomer of Formula 1 Kind/ Molar % | Other Monomers Kind/ Molar % | Average numerical molecular weight | Graft copolymer in second step *1 | *2 |
|---|---|---|---|---|---|---|---|
| 1 | P-1 | 50 | B-1/50 | | 14300 | D-1 | 20 |
| 2 | P-2 | 50 | B-2/50 | | 25900 | D-1 | 11 |
| 3 | P-3 | 50 | B-3/50 | | 31000 | D-2 | 15 |
| 4 | P-4 | 50 | B-4/50 | | 10700 | D-1 | 40 |
| 5 | P-5 | 50 | B-6/50 | | 45000 | D-3 | 55 |
| 6 | P-6 | 50 | B-5/45 | C-1/5 | 14100 | D-2 | 25 |
| 7 | P-7 | 50 | B-2/35 | C-1/15 | 22000 | D-1 | 15 |
| Comparison Example | | | | | | | |
| 1 | R-1 | 50 | B-1/50 | | 14300 | D-1 | 3 |
| 2 | R-2 | 50 | B-1/50 | | 14300 | D-1 | 80 |
| 3 | R-3 | 50 | B-2/50 | | 25900 | DR-1 | 15 |
| 4 | R-4 | 35 | B-5/40 | C-1/25 | 10200 | DR-2 | 20 |
| 5 | R-5 | 50 | BR-1/50 | | 14300 | D-2 | 25 |

In Table 1:
*1: Kind of polyoxyalkylene monoalkylether and/or polyoxyalkylene monoalkenylether;
*2: Weight part of polyoxyalkylene monoalkylether and/or polyoxyalkylene monoalkenylether reacted with 100 weight parts of copolymer obtained in the first step;
B-1: α-allyl-ω-methyl-polyoxyethylene (n = 7);
B-2: α-allyl-ω-methyl-polyoxyethylene (n = 35);
B-3: α-allyl-ω-methyl-polyoxyethylene (n = 60);
B-4: α-allyl-ω-acetyl-polyoxyethylene (n = 40);
B-5: α-allyl-ω-methyl-polyoxyethylene (n = 40);
B-6: α-allyl-ω-hydroxy-polyoxyethylene (n = 35) polyoxypropylene (with repetition number of oxypropylene units equal to 35, herein written as n = 35);
BR-1: α-allyl-ω-methyl-polyoxyethylene (n = 90);
C-1: Styrene:
D-1: α-oleyl-ω-hydroxy-polyoxyethylene (n = 6) polyoxypropylene (m = 40);
D-2: α-lauryl-ω-hydroxy-polyoxyethylene (n = 3) polyoxypropylene (m = 35);
D-3: α-oleyl-ω-hydroxy-polyoxyethylene (n = 9) polyoxypropylene (m = 55);
DR-1: α-lauryl-ω-hydroxy-polyoxyethylene (n = 15);
DR-2: α-lauryl-ω-hydroxy-polyoxyethylene (n = 80).

Part 2 (Preparation and Evaluation of Concrete)
Preparation of Concrete

Concrete samples to be tested were prepared as follows under the conditions shown in Table 2. Normal portland cement (specific weight=3.16; braine value=3300), fine aggregates (Ooi-gawa River sand with specific weight=2.63) and coarse aggregates (crushed stones from Okazaki with specific weight=2.66) were sequentially added into a pan-type forced kneading mixer with capacity 50 liters and subjected to a free kneading process for 15 seconds. Next, for test examples corresponding to Condition 1 of Table 2, a cement dispersant, an agent for controlling air content and an air content stabilizing agent comprising graft copolymer synthesized in Part 1 were mixed with water such that the slump would be within a target range of 18±1 cm and the air content within a target range of 4.5±1% and kneaded together for 90 seconds. For test examples corresponding to Condition 2 of Table 2, a cement dispersant, an agent for controlling air content and an air content stabilizing agent comprising graft copolymer synthesized in Part 1 were mixed with water such that the slump would be within a target range of 21±1 cm and the air content within a target range of 4.5±1% and kneaded together for 2 minutes. Details of these concrete samples are shown in Table 3.

TABLE 2

| Condition | Water/Cement ratio (%) | Ratio of fine aggregates (%) | Unit amount (kg/m³) | | | |
|---|---|---|---|---|---|---|
| | | | Water | Cement | Fine aggregates | Coarse aggregates |
| 1 | 50 | 49 | 165 | 330 | 867 | 960 |
| 2 | 33 | 44 | 165 | 500 | 742 | 944 |

TABLE 3

| Examples: | Condition | Air content stabilizing agent: graft copolymer | | Agent for controlling air content | | Cement dispersant | |
|---|---|---|---|---|---|---|---|
| | | Kind | Amount | Kind | Amount | Kind | Amount |
| Test Examples | | | | | | | |
| 8 | 1 | P-1 | 0.02 | *3 | 0.002 | *4 | 0.19 |
| 9 | 1 | P-2 | 0.05 | *3 | 0.003 | *4 | 0.20 |
| 10 | 1 | P-3 | 0.04 | *3 | 0.002 | *4 | 0.22 |
| 11 | 1 | P-4 | 0.01 | *3 | 0.002 | *4 | 0.19 |
| 12 | 1 | P-5 | 0.01 | *3 | 0.002 | *4 | 0.19 |
| 13 | 1 | P-6 | 0.07 | *3 | 0.003 | *4 | 0.20 |
| 14 | 1 | P-7 | 0.07 | *3 | 0.003 | *4 | 0.20 |
| Comparison Examples: | | | | | | | |
| 7 | 1 | R-1 | 0.05 | *3 | 0.001 | *4 | 0.19 |
| 8 | 1 | R-2 | 0.01 | *3 | 0.010 | *4 | 0.20 |
| 9 | 1 | R-3 | 0.01 | *3 | 0.0002 | *4 | 0.19 |
| 10 | 1 | R-4 | 0.08 | *3 | 0.004 | *4 | 0.20 |
| 11 | 1 | R-5 | 0.04 | *3 | 0.004 | *4 | 0.20 |
| 12 | 1 | — | 0 | *3 | 0.0002 | *4 | 0.19 |
| Test Examples: | | | | | | | |
| 15 | 2 | P-1 | 0.02 | *3 | 0.006 | *5 | 0.27 |
| 16 | 2 | P-2 | 0.04 | *3 | 0.008 | *5 | 0.28 |
| 17 | 2 | P-3 | 0.03 | *3 | 0.006 | *5 | 0.28 |
| 18 | 2 | P-4 | 0.01 | *3 | 0.003 | *5 | 0.27 |
| 19 | 2 | P-5 | 0.01 | *3 | 0.003 | *5 | 0.27 |
| 20 | 2 | P-6 | 0.08 | *3 | 0.007 | *5 | 0.28 |
| 21 | 2 | P-7 | 0.04 | *3 | 0.007 | *5 | 0.28 |
| Comparison Examples: | | | | | | | |
| 13 | 2 | R-1 | 0.03 | *3 | 0.003 | *5 | 0.27 |
| 14 | 2 | R-2 | 0.02 | *3 | 0.025 | *5 | 0.28 |
| 15 | 2 | R-3 | 0.04 | *3 | 0.003 | *5 | 0.28 |
| 16 | 2 | R-4 | 0.07 | *3 | 0.012 | *5 | 0.28 |
| 17 | 2 | R-5 | 0.05 | *3 | 0.015 | *5 | 0.28 |
| 18 | 2 | — | 0 | *3 | 0.001 | *5 | 0.27 |

In Table 3:
Amount: Added amount per 100 weight parts of cement;
*3: Air entraining agent for rodin salt concrete (AE-300 produced by Takemoto Yushi Kabushiki Kaisha);
*4: Polycarboxylic cement dispersant (CHUPOL HP-8 produced by Takemoto Yushi Kabushiki Kaisha);
*5: Polycarboxylic cement dispersant (CHUPOL HP-11 produced by Takemoto Yushi Kabushiki Kaisha).

Evaluation of Concrete Samples

For each of the tested concrete samples, the air content, its rate of change; slump, slump loss and compression strength were obtained. The values of air content and slump 60 minutes and 90 minutes after the samples were prepared were measured by transferring the prepared concrete from the aforementioned pan-type forced kneading mixer to a tiltable mixer and storing it while rotating the mixer at a rate of 2 rpm, similar to the operation of an agitator for a container for ready-mixed concrete. The results of measurements are summarized in Table 4.

Air content was measured according to JIS-Al 128 (Japanese Industrial Standard) immediately after the samples were prepared (t=0) and 60 minutes and 90 minutes thereafter (t=60) and (t=90). Its rate of change was calculated as 100×((Air content at t=90)−(air content at t=0))/(air content at t=0). Slump was measured according to JIS-A1101 at the same times as the measurement of the air content, that is at t=0, 60 and 90. Slump loss was calculated as the percentage of the slump at t=90 with respect to the slump at t=0. Compressive strength was measured at t=90 according to JIS-A1108.

TABLE 4

| Examples | Immediately afterwards Air content (%)/Slump (cm) | t = 60 minutes Air content (%)/Slump (cm) | t = 90 minutes Air content (%)/Slump (cm) | Rate of change in air content (%) | Slump loss (%) | Compressive strength (N/mm²) at 28 days |
|---|---|---|---|---|---|---|
| Test Examples: | | | | | | |
| 8 | 4.7/18.6 | 4.5/17.0 | 4.6/16.1 | −4.5 | 86.5 | 44.0 |
| 9 | 4.4/18.4 | 4.5/17.2 | 4.6/16.3 | +2.1 | 88.5 | 44.5 |
| 10 | 4.5/18.8 | 4.7/17.9 | 4.7/17.0 | +4.4 | 90.4 | 44.1 |
| 11 | 4.7/18.2 | 4.8/16.8 | 4,8/15.8 | +2.1 | 88.6 | 44.5 |
| 12 | 4.7/18.2 | 4.8/16.8 | 4.8/15.8 | +2.1 | 86.8 | 43.8 |
| 13 | 4.6/18.4 | 4.5/17.1 | 4.6/16.5 | 0 | 89.6 | 44.9 |
| 14 | 4.7/18.2 | 4.8/16.8 | 4.8/15.8 | 0.5 | 89.2 | 44.8 |
| Comparison Examples | | | | | | |
| 7 | 4.3/18.0 | 5.4/15.1 | 6.5/13.0 | +51.1 | 72.2 | 40.0 |
| 8 | 4.5/18.3 | 6.0/15.6 | 7.2/14.0 | +60.0 | 76.5 | 38.2 |
| 9 | 4.2/18.2 | 5.0/14.8 | 6.0/12.0 | +42.8 | 65.9 | 40.9 |
| 10 | 4.6/18.5 | 5.6/15.1 | 6.7/13.3 | +45.6 | 71.9 | 39.5 |
| 11 | 4.4/18.6 | 5.5/15.0 | 6.4/12.4 | +45.4 | 66.7 | 40.1 |
| 12 | 4.6/18.2 | 5.7/15.0 | 7.3/12.8 | +58.7 | 70.3 | 37.9 |
| Test Examples: | | | | | | |
| 15 | 4.5/21.7 | 4.3/20.9 | 4.3/19.3 | −4.6 | 88.9 | 77.0 |
| 16 | 4.3/21.5 | 4.4/20.6 | 4.5/19.5 | +3.7 | 90.7 | 77.6 |
| 17 | 4.6/21.4 | 4.5/20.5 | 4.4/19.2 | −4.3 | 89.7 | 77.2 |
| 18 | 4.7/21.7 | 4.6/21.0 | 4.4/20.1 | −3.9 | 92.6 | 77.7 |
| 19 | 4.7/21.7 | 4.6/21.0 | 4.4/20.1 | −3.6 | 92.6 | 77.7 |
| 20 | 4.7/21.6 | 4.7/20.3 | 4.9/19.0 | +2.7 | 94.0 | 78.5 |
| 21 | 4.7/21.7 | 4.6/21.0 | 4.4/20.1 | +2.6 | 93.6 | 78.1 |
| Comparison Examples: | | | | | | |
| 13 | 4.4/21.5 | 4.5/17.6 | 5.8/14.9 | +31.8 | 69.3 | 71.0 |
| 14 | 4.7/21.7 | 4.6/18.3 | 6.3/15.4 | +34.4 | 70.9 | 68.5 |
| 15 | 4.3/21.6 | 5.4/17.3 | 6.0/15.2 | +39.5 | 70.3 | 69.6 |
| 16 | 4.6/21.2 | 5.6/18.1 | 6.5/15.0 | +41.3 | 70.7 | 67.5 |
| 17 | 4.2/21.4 | 5.0/18.5 | 6.3/15.8 | +50.0 | 73.8 | 68.8 |
| 18 | 4.6/21.2 | 5.6/18.1 | 6.5/15.0 | +41.8 | 71.4 | 67.9 |

As should be clear from the description given above, this invention can inhibit the increase in entrained air content of hydraulic cement compositions while they are being transported and being kneaded either continuously or intermittently or being temporarily stored and stabilize the entrained air content with time. It is also possible to inhibit the lowering of fluidity and hardened objects with improved strength can be produced.

What is claimed is:

1. An agent for stabilizing air content of hydraulic cement compositions, said agent comprising graft copolymers obtained by a first step and a second step, said first step being for obtaining copolymers with average numerical molecular weight 5000–50000 by radical polymerization of a mixture of radical polymerizable monomers containing anhydrous maleic acid and monomers of a form given by Formula 1, together in an amount of 80 molar % or more and at molar ratio of 40/60–60/40, said second step being for obtaining graft copolymers by a graft reaction of 100 weight parts of the copolymers obtained in said first step and 7–60 weight parts of polyoxyalkylene monoalkylether and/or polyoxyalkylene monoalkenylether with a block addition of a total of 23–70 moles of ethylene oxide and propylene oxide per 1 mole of aliphatic alcohol with 8–20 carbon atoms, said Formula 1 being

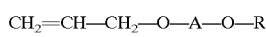

where R is hydrogen, methyl group or a residual group obtained by removing the hydroxyl group from aliphatic acid with 1–18 carbon atoms, and A is a residual group obtained by removing all hydroxyl groups from (poly)alkylene glycol with repetition number 1–80 of oxyalkylene units consisting either only of oxyethylene units or of both oxyethylene units and oxypropylene units.

2. The agent of claim 1 wherein said first step is for obtaining copolymers with average numerical molecular weight 10000–40000 by radical polymerization without using any solvent.

3. The agent of claim 2 wherein A in said Formula 1 is a residual group obtained by removing all hydroxyl groups from (poly)ethylene glycol.

4. The agent of claim 2 wherein said mixture of radical polymerizable monomers contains anhydrous maleic acid, monomers of the form given by Formula 1 and styrene.

5. The agent of claim 2 wherein said second step is for obtaining graft copolymers by a graft reaction of the copolymers obtained in said first step and polyoxyalkylene monoalkylether and/or polyoxyalkylene monoalkenylether in the presence of an amine catalyst.

6. The agent of claim 2 wherein said second step is for obtaining graft copolymers by a graft reaction of 100 weight parts of the copolymers obtained in said first step and 10–50 weight parts of polyoxyalkylene monoalkylether and/or polyoxyalkylene monoalkenylether.

7. The agent of claim 2 wherein said polyoxyalkylene monoalkylether and/or polyoxyalkylene monoalkenylether includes a block addition of 3–10 moles of ethylene oxide and 20–60 moles of propylene oxide per 1 mole of aliphatic alcohol with 12–18 carbon atoms.

8. A hydraulic cement composition comprising:

cement, aggregates, water, a cement dispersant, an agent for controlling air content and an agent for stabilizing air content, said agent for stabilizing air content being contained in an amount of 0.001–0.5 weight parts per 100 weight parts of said cement and comprising graft copolymers obtained by a first step and a second step, said first step being for obtaining copolymers with average numerical molecular weight 5000–50000 by radical polymerization of a mixture of radical polymerizable monomers containing anhydrous maleic acid and monomers of a form given by Formula 1, together in an amount of 80 molar % or more and at molar ratio of 40/60–60/40, said second step being for obtaining graft copolymers by a graft reaction of 100 weight parts of the copolymers obtained in said first step and 7–60 weight parts of polyoxyalkylene monoalkylether and/or polyoxyalkylene monoalkenylether with a block addition of a total of 23–70 moles of ethylene oxide and propylene oxide per 1 mole of aliphatic alcohol with 8–20 carbon atoms, said Formula 1 being

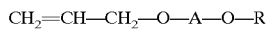

$CH_2=CH-CH_2-O-A-O-R$ where R is hydrogen, methyl group or a residual group obtained by removing the hydroxyl group from aliphatic acid with 1–18 carbon atoms, and A is a residual group obtained by removing all hydroxyl groups from (poly) alkylene glycol with repetition number 1–80 of oxyalkylene units consisting either only of oxyethylene units or of both oxyethylene units and oxypropylene units.

9. The hydraulic cement composition of claim 8 wherein said first step is for obtaining copolymers with average numerical molecular weight 10000–40000 by radical polymerization without using any solvent.

10. The hydraulic cement composition of claim 9 wherein A in said Formula 1 is a residual group obtained by removing all hydroxyl groups from (poly)ethylene glycol.

11. The hydraulic cement composition of claim 9 wherein said mixture of radical polymerizable monomers contains anhydrous maleic acid, monomers of the form given by Formula 1 and styrene.

12. The hydraulic cement composition of claim 9 wherein said second step is for obtaining graft copolymers by a graft reaction of the copolymers obtained in said first step and polyoxyalkylene monoalkylether and/or polyoxyalkylene monoalkenylether in the presence of an amine catalyst.

13. The hydraulic cement composition of claim 9 wherein said second step is for obtaining graft copolymers by a graft reaction of 100 weight parts of the copolymers obtained in said first step and 10–50 weight parts of polyoxyalkylene monoalkylether and/or polyoxyalkylene monoalkenylether.

14. The hydraulic cement composition of claim 9 wherein said polyoxyalkylene monoalkylether and/or polyoxyalkylene monoalkenylether includes a block addition of 3–10 moles of ethylene oxide and 20–60 moles of propylene oxide per 1 mole of aliphatic alcohol with 12–18 carbon atoms.

15. The hydraulic cement composition of claim 9 wherein said cement dispersant is a polycarboxylic acid cement dispersant.

16. The hydraulic cement composition of claim 9 which is concrete.

* * * * *